Patented June 27, 1933

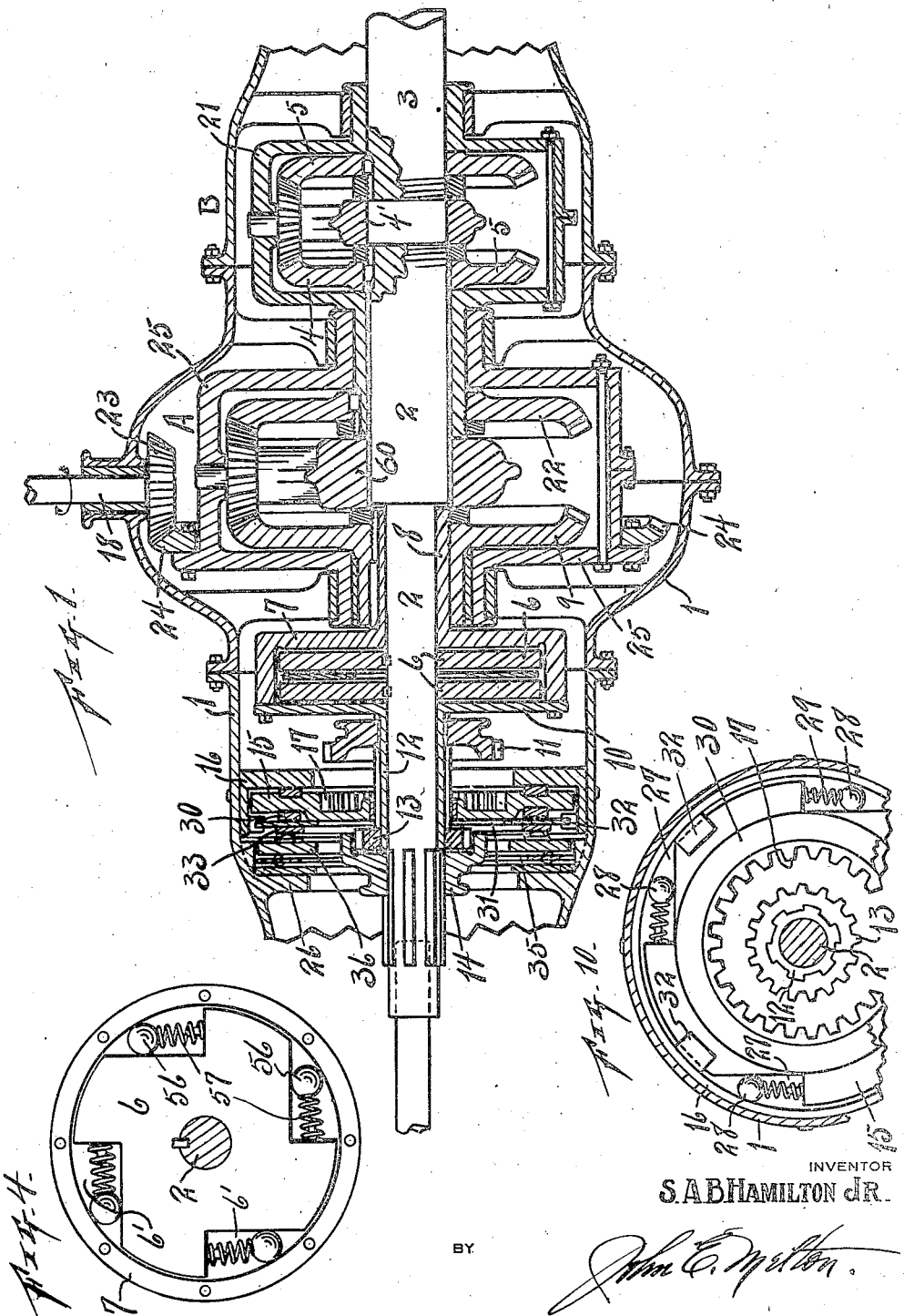

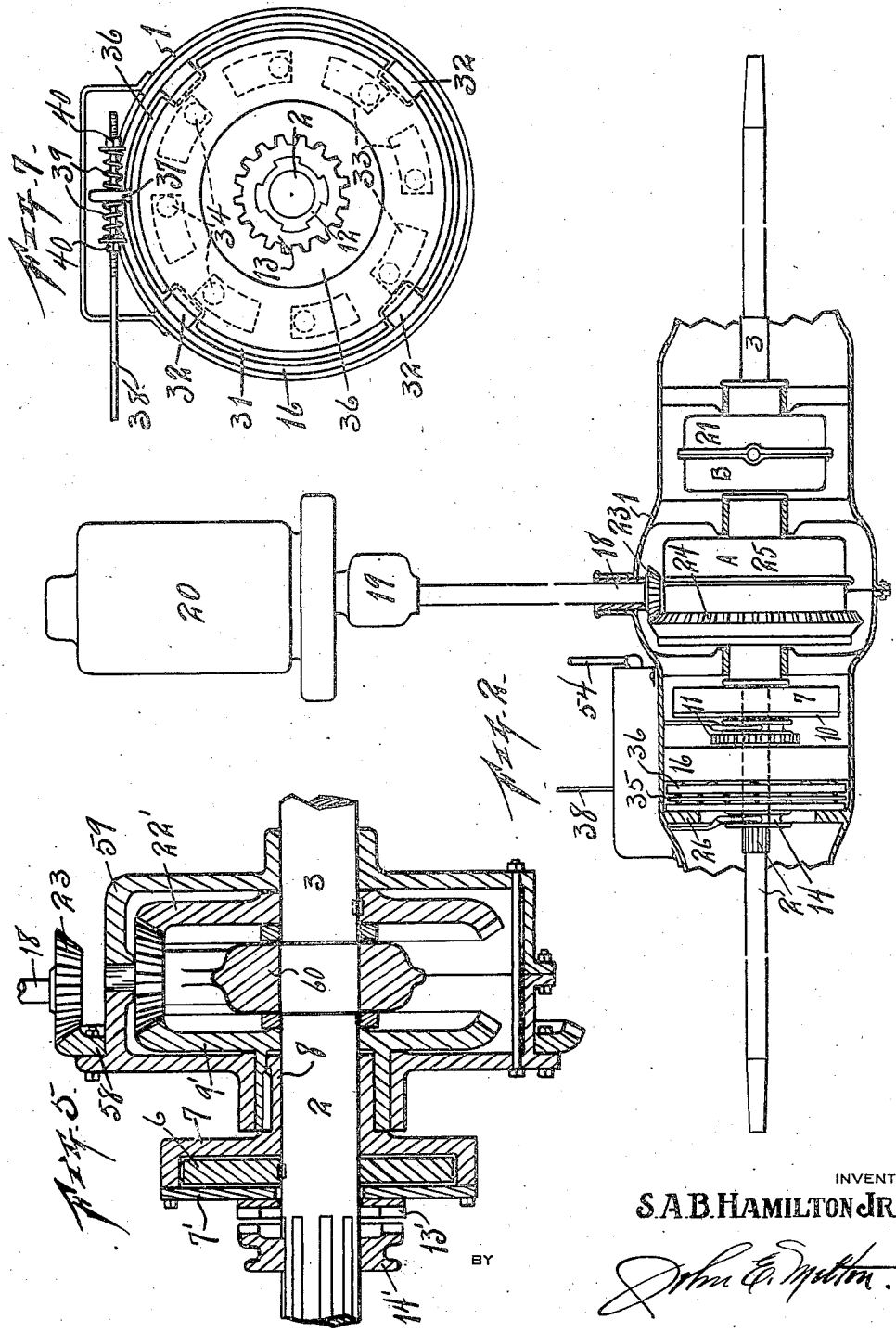

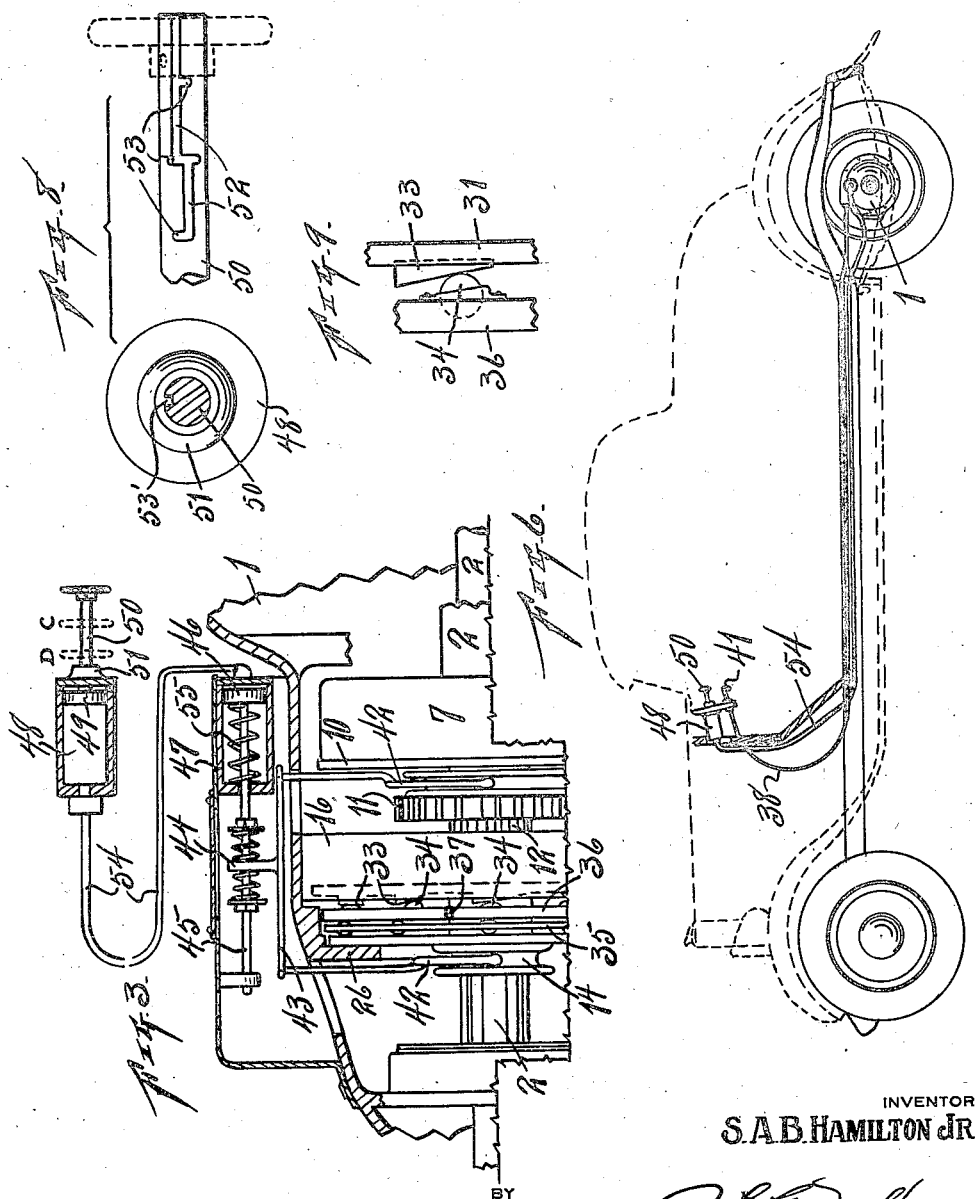

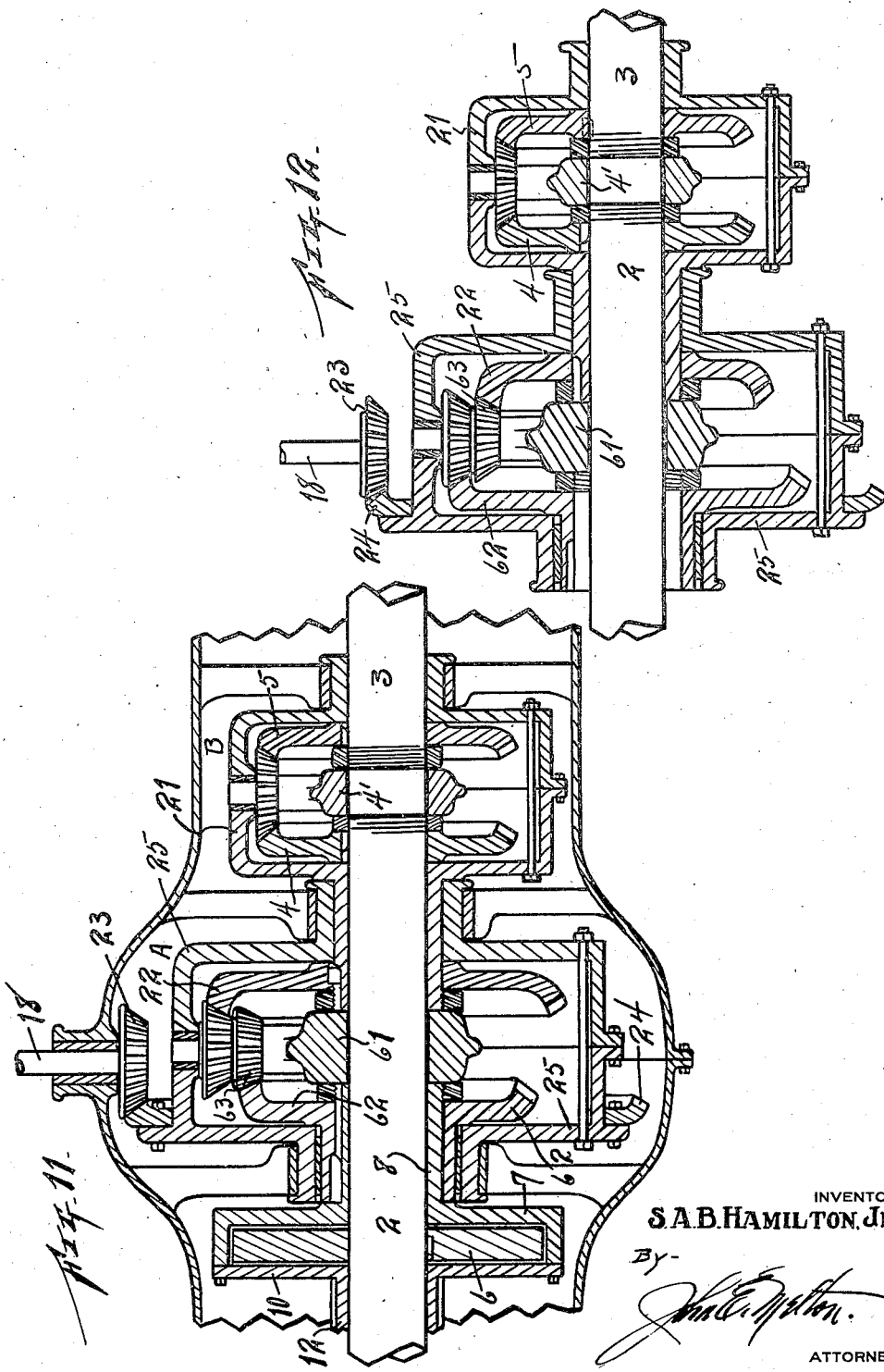

1,915,606

UNITED STATES PATENT OFFICE

SAMUEL A. B. HAMILTON, JR., OF FORT WORTH, TEXAS

DIFFERENTIAL FOR MOTOR VEHICLES AND THE LIKE

Application filed June 27, 1932. Serial No. 619,508.

My invention relates to differentials for motor vehicles and more particularly to free-wheeling and dual ratio type of differentials; and the object is to provide a flexible differential for motor vehicles that may be made in the full floating type, or the various types of standard form. Another object is to provide a differential for motor vehicles that may be operated in the standard form or may be changed at the will of the operator to operate in any predetermined varation of speed relative to the standard ratio. Another object is to provide a differential for motor vehicles in which the operator or driver of the vehicle has complete control of the vehicle at all speeds and may transfer from standard to dual ratio in either free-wheeling or direct drive without throttling the engine.

An advantage of this device is that it protects the engine of the vehicle, in that the dual ratio feature permits the operator of the vehicle to maintain a constant speed without raising the speed of the engine. Another advantage of this differential is that the dual ratio feature may be set so that the vehicle will not roll backward, which is a safety feature in mountainous country.

Other objects and advantages will be fully explained in the following description and the invention will be more particularly pointed out in the claims.

Reference is had to the accompanying drawings which form a part of this application.

Fig. 1 is a vertical section of the differential.

Fig. 2 is a similar view, showing a portion of the mechanism in section, and its relation to the engine or the driving medium.

Fig. 3 is a partial section of the differential, showing pneumatic means for controlling the dual ratio feature and the free-wheeling of the same.

Fig. 4 is a detail view of the free-wheeling mechanism for the standard drive.

Fig. 5 is a vertical section of a portion of the differential, showing the adaptation of the free-wheeling unit independent of the dual ratio mechanism.

Fig. 6 is a diagrammatic view of the vehicle, illustrating the installation of the device and the mechanism for controlling the same.

Fig. 7 is a detail view of the mechanism for controlling the free-wheeling feature of the dual ratio mechanism.

Fig. 8 is a detail view of the control lever for setting the mechanism to operate in standard ratio, dual ratio, and dual ratio free-wheeling.

Fig. 9 is a detail view of the clutch mechanism for holding the dual ratio parts of the differential in operative position.

Fig. 10 is a face view of the clutch disk for the free-wheeling mechanism of the dual ratio gears and the control for the same.

Fig. 11 is a vertical section of a portion of the differential, illustrating the use of variable sizes of gears for decreasing the speed of the axles relative the normal ratio.

Fig. 12 is a similar view, showing the relation of the axle gears for causing an increase of axle speed relative the standard ratio.

Similar characters of reference are used to indicate the same parts throughout the several views.

The device consists of a differential housing 1 in which there are used two complete differential units or gearings, the standard differential gears B and a unit of auxiliary differential gears A, each set cooperating with each other for driving the axles in normal direct speed, normal free-wheeling, a change of speed relative the normal ratio (which may be termed as dual ratio), and dual ratio in free-wheeling. The differential is provided with the usual axles 2 and 3 which are keyed to the axle gears 4 and 5 respectively of the differential unit B, or the standard gearing. Each of the units A and B are provided with the usual spider gears which mesh with axle gears and each unit is provided with a casing in the usual manner of differential gears. Free-wheeling disks 6 are keyed to the axle 2, and these disks are enclosed in a housing 7 so that they may have frictional contact with the inner periphery thereof. The housing 7 is provided with a sleeve 8 integral therewith and revolubly mounted on the axle 2 and adapted to be keyed to the gear 9 of the auxiliary differential gearing A. A cap or facing 10 is made rigid with the housing 7 so that the disks 6 may be enclosed in the housing 7. The member 10 is provided with a splined sleeve 12 integral therewith and revolubly mounted on the axle 2. A gear wheel 13 is made integral with the outer end of the splined shaft or sleeve 12 and adapted to mesh with a gear wheel 14 which is keyed to and slidably mounted on the axle 2 of the differential. A gear wheel 11 is interposed between the cap or facing 10 and gear 13 and slidably mounted on the splined sleeve 12 of the member 10. The gear 11 is also rotatably rigid with the splined sleeve 12.

The gear 11 is adapted to slide into mesh with internal gears 17 of a friction disk 15. The disk 15 is rotatably mounted on the sleeve 12 adjacent the gear 13 so that the gear 11 may be freely slid between the facing 10 and the gears 17.

An annular ring 16 is rigidly mounted within the housing 1 of the differential so that the disk 15 may have frictional contact with the inner periphery thereof. The annular ring 16 is cup shape in form so that the side thereof may serve to limit any axial movement of the disk 15. The disk is adapted to be operated so that when it is held rotatably stationary when the gear 11 is meshed with the gears 17, the axles are driven in dual ratio without free wheeling; and when the disk 15 is permitted to rotate the axles will be driven in dual ratio but the vehicle is permitted to free-wheel.

The auxiliary differential gearing A is driven by the usual drive shaft 18 which is operatively connected to and driven by an engine 20 and transmission 19. The drive shaft is provided with a pinion 23 rigid therewith which meshes with and drives a ring gear 24. The ring gear 24 is made rigid with the casing 25 of the auxiliary differential unit A and drives the casing 25 in the usual manner and the casing spider gears 60 which mesh with and drive the gears 9 and 22 of the unit A.

The driving force of the engine 20 is imparted to the differential gear unit B through the unit A. The gear 22 of the auxiliary unit A is keyed to a sleeve portion of the housing 21 of the standard differential unit B which imparts a driving force to the casing 21 of the standard differential unit B similar to the drive of the auxiliary unit A.

The slide gears 11 and 14 may be made integral so that they may move in unison on the splined sleeve 12 and axle 2 respectively. The gears 11 and 14 are adapted to be positioned in three distinct positions. The position of the gears 11 and 14 shown in Fig. 1 controls the differential gearing as a whole to impart a standard forward drive of the axles without free wheeling. In this position the gear 9 is held rigid with the axle 2 through the housing 7 and its facing or cap 10 and gear 14 meshing with the gear 13 which is rigid with the sleeve 12 of the cap 10. A second position of the gears 11 and 14 is a release of the gears 14 and 13 which locks the gear 9 with the axle 2 through frictional contact with the disks 6 which are keyed to the axle 2. In this position the drive of the shaft 18 forward will drive the vehicle in standard ratio but the forward momentum of the vehicle above the forward pull of the power medium 20 is unrestricted. This second position of the gears 11 and 14 permits the vehicle to be driven in standard ratio in free-wheeling. A third movement of the gears 11 and 14 permits the vehicle to be driven in a different speed from the standard ratio, as shown in Figs. 1, 11, and 12, either with or without free-wheeling. In this position the gear 11 is meshed with the internal gear 17 of the disk 15 and the gear 9 is keyed to the housing 1 of the differential through the frictional contact of the disk 15 with the ring 16. The disk 15 cooperates with the ring 16 so that it is locked against forward movement but may run in reverse direction. This permits the vehicle to be driven in a speed ratio different to the normal drive ratio with free-wheeling. Provision is made for holding the disk 15 stationary in the housing 1 so that the vehicle may be driven in this ratio without free-wheeling. The disk 15 and the disks 6 are all operated or adapted to frictionally contact with their rings or drums in a similar manner, the disks 6 being locked against rotation when the drum 7 is being driven forward, and the disk 15 being locked against rotation when it is being driven forward. A reverse rotation of the drum 7 or the disk 15 is permitted for free-wheeling of the vehicle except when other cooperating parts are used to lock the drum 7 with the axle 2 or lock the disk 15 against rotation forward or backward.

The disk 15 is interposed between the side wall of the ring 16 and a flanged portion 26 of the differential housing 1 which is made integral therewith. Cut out portions or slots 27 are provided in the outer periphery of the disk 15 and balls or rollers 28 are carried in these slots so that they will engage the inner periphery of the ring 16 and prohibit the disk 15 from rotating in the direction of the forward movement of the vehicle. A roller or ball 28 is resiliently carried in each of the slots 27 of the disk 15 by means of a coil spring 29. The spring 29 bears against a side wall of the slot 27 and against the roller 28 so that the ball or roller 28 will normally bear against the inner periphery of the stationary ring 16 prohibiting the disk to rotate forward but permitting the disk 15 to rotate backward.

The face of the disk 15, opposite the side wall of the ring 16, is provided with a clutch facing 30 which is adapted to be frictionally engaged by a disk 31. The disk 31 is provided with slots in the outer periphery thereof and the disk is held slidably in the housing 1 by means of lugs 32 which are integral with the inner periphery of the ring 16 and adapted to project into the slots of the disk 31. The side of the disk 31, opposite the clutch facing 30, is provided with wedge shaped clutch face members 33 annularly disposed about the face thereof and adapted to be engaged by rollers or balls 34. The clutch face members 33 are each formed to slope outwardly from the face of the disk 31 at a slight angle therefrom so that a partial rotation of the disk 35 will cause the rollers 34 to wedge the disk 31 against the disk 15.

The disk 35 is rotatably carried in the housing 1 between the members 33 and the flange 26 of the housing and adapted to be oscillated therein manually to serve as a clutch for the disk 15. A ball race 36 is interposed between the disk 35 and the flange portion 26 of the housing 1. A lug 37 is made rigid with the outer periphery of the disk 35 and radiates therefrom. The lug 37 is slotted to receive a control rod 38 which projects therethrough and is held in operative relation to the lug 37 by means of coil springs 39. A spring 39 is placed on each side of the lug 37 and around the rod 38. Each spring is provided with a nut 40 for causing a resilient connection for the rod 38 and lug 37. The rod 38 may be extended to the dash of the vehicle and a convenient form of handle or button 41 may be provided for manually actuating the same for causing the clutch disk 35 to engage and hold the disk 15, as shown in Fig. 6. When the button 41 is actuated for holding the disk 15 against rotation the vehicle may be driven in dual ratio without free-wheeling.

The slide gears 11 and 14 are each provided with yokes 42 which are made integral with each other by means of a link bar 43. A lug 44 is provided on the link bar 43 and made rigid therewith to serve as a connection for the actuating mechanism for controlling the position of the gears 11 and 14. The actuating mechanism consists of a control rod 45 which may be connected to the lug 44 in a similar manner to the connection of the control rod 38 with the lug 37 of the disk 35. The other end of the rod 45 is made rigid with a piston 46 of a hydraulic or pneumatic cylinder 47. The cylinder 47 and its piston 46 may be made rigid with the housing 1 of the differential and positioned relative the control rod or link bar 43 so as to slide the gears 11 and 14 to their various positions.

A cylinder 48, which is similar to the cylinder 47, is positioned on the dash of the vehicle, as shown in Fig. 6, and this cylinder is provided with a piston 49 which is adapted to be reciprocated therein by the manual operation of the operator. A rod 50 is made rigid with the piston 49 and projected through the cap 51 of the cylinder to serve as a handle for the operator. The rod 50 is provided with a groove 52 formed longitudinally in the rod and having abrupt turns 53 so that the rod will have to be turned in the cylinder before the piston 49 can be made to travel its full extent in the cylinder 48. The cylinder cap 51 is provided with a lug or key 53' in the port thereof which is adapted to project into the groove 52 of the rod, thus necessitating the partial rotation of the rod 50 so that the lug 53' will be permitted to pass the abrupt curves or corners 53 of the groove 52 in the reciprocation of the rod and piston 49. A pipe 54 is joined to the cylinders 47 and 48 which serves as a fluid connection between the cylinders. The pipe 54 and the cylinders are filled with fluid so that any manual movement of the piston 49 imparts a similar movement to the piston 46 of the cylinder 47. A spring 55 is carried in the cylinder 47 for holding the piston 46 in normal position as shown in Fig. 3. The coil spring 55 is interposed between the piston 46 and the end of the wall of the cylinder 47 opposite the pipe connection 54.

When the piston 46 is in normal position in the cylinder 47 adjacent the pipe connection 54, the piston 49 is at its extreme position in the cylinder 48 away from the pipe connection 54 of the cylinder 48. When the bar 50 is manually moved, the hydraulic connection with the gears 11 and 14 cause them to move in unison. The position shown in Fig. 3 is for normal drive ratio without free-wheeling. When the bar or rod 50 is moved to the dotted position indicated as C, in Fig. 3, the mechanism is set for a normal drive ratio with free-wheeling. Further movement of the bar 50 to the dotted position indicated by D positions the mechanism for a change of speed from the normal drive, with or without free-wheeling. The control of the free-wheeling in this speed being controlled by the position of the button 41 on the dash of the vehicle.

When the clutch mechanisms 33 and 34 are operated to engage the members 33 for holding the disk 15 stationary the mechanism is positioned for the higher speed ratio without free-wheeling.

Fig. 5 illustrates the adaptation of the free-wheeling mechanism to the ordinary differential gearing. In this structure the differential gearing 9' is keyed to the housing 7 and the gear 22' is keyed to the axle 3 in the usual manner. The free-wheeling effect is attained in this instance in a similar manner to that attained by the structure shown in Fig. 1. A cap 7' is provided for the drum 7, and the cap is provided with a face clutch 13' which is adapted to be engaged by a slide gear 14". The slide gear 14' is adapted to be manually slid on a splined portion of the axle 2 for engaging and disengaging the gear 13' which is integral with the cap 7'.

The free-wheeling disk 6 is provided with slots 6' in the outer periphery thereof that are adapted to resiliently carry balls or rollers 56. The balls 56 are adapted to engage the inner periphery of the drum 7 by the tension of coil springs 57. The coil springs 57 cause the disk 6 to function relative its housing 7 in a similar manner to the operation of the disk 15 and ring 16. This structure causes the disk 6 to be held rigid with the drum 7 when the vehicle is being driven forward, but releases the disk 6 relative the drum 7 when the momentum of the vehicle is greater than the engine speed, thus permitting free wheeling. When the gear 14' engages the gear 13' the differential gear 9' is made rigid with the axle 2, causing the mechanism to operate in the usual manner without free-wheeling.

Figs. 11 and 12 illustrate a variation in the structure of the auxiliary differential unit A, to attain a speed of more or less than the dual ratio illustrated in Fig. 1. When the mechanism is set for normal drive the axles 2 and 3 are driven by the differential unit B; but when the mechanism is set for dual ratio, or change of speed relative to the normal ratio, the ratio attained is governed by the diameter of the gear 62 relative the diameter of the gear 22 of the auxiliary differential gears A. The use of two sizes of gears 22 and 62 in the differential unit A necessitates the use of two sets of spider gears on the spider 61. A supplemental pinion 63 is made rigid on the shaft of the spider 61 that carries the usual pinion. In Fig. 11 the supplemental pinion 63 is meshed with the gear 62 and the gear 62 is keyed to the disk housing 7. The standard pinion of the spider is meshed with the gear 22 and the gear 22 is keyed to the housing 21 of the differential unit B. The speed imparted from the unit A to the unit B, in this instance, is above normal ratio but less than the dual ratio, as shown in Fig. 1. Fig. 12 illustrates a reverse of the structure shown in Fig. 11 in which the standard pinion meshes with the gear keyed to the housing 7, while the pinion 63 is meshed with the gear 22 which is keyed to the housing of the unit B. This arrangement imparts a speed to the axles above the dual ratio form in which the gears 9 or 62 and 22 are of the same diameter.

What I claim, is:

1. In a differential for motor vehicles and the like comprising differential gears and axles driven thereby; auxiliary differential gears carried by one of said axles and adapted to drive said first named gears, means for locking one of said gears of said auxiliary gears for changing the speed ratio of said axles, means for permitting said vehicle to free-wheel in normal speed, means cooperating with said auxiliary gears for permitting said vehicle to free-wheel in said changed speed ratio, said differential being adapted to lock said vehicle against reverse movement when said gear is locked, and means for driving said auxiliary gears.

2. In a differential for motor vehicles and the like comprising differential gears and axles driven thereby, auxiliary gears carried by one of said axles and adapted to drive said first named gears, locking means for one gear of said auxiliary gears for decreasing the speed of said axles, means for permitting said locking means to rotate with the forward movement of said vehicle to cause a free-wheeling movement of said vehicle, said locking means adapted to hold said vehicle against reverse movement, and means for driving said auxiliary gears.

3. In a differential for motor vehicles and the like comprising differential gears and axles driven thereby; auxiliary differential gears for driving said first named gears, one gear of said auxiliary gears keyed to the casing of said first named gears, the other gear of said auxiliary gears adapted to be locked against rotation for changing the speed of said axles and holding said vehicle against reverse movement, said locking means adapted to permit a free-wheeling movement of said axles, means cooperating with said auxiliary gears for causing a free-wheeling movement of said axles in normal speed, and means for driving said auxiliary gears.

4. In a differential for motor vehicles and the like comprising differential gears and axles driven thereby, auxiliary differential gears for driving said first named gears, means cooperating with said auxiliary gears for causing said axles to free wheel in normal speed, means for locking one of said auxiliary gears for changing the speed of said axles, said locking means adapted to permit said axles to free-wheel while in said changed speed and locking said vehicle against reverse movement while in said changed speed, and means for driving said auxiliary differential gears.

5. In a differential for motor vehicles and the like comprising differential gears and axles driven thereby; auxiliary differential gears carried by one of said axles and adapted to drive said first named gears, means cooperating with one of said auxiliary gears for changing the speed ratio of said axles, said means adapted to lock said vehicle against reverse movement, and means for driving said auxiliary gears.

6. In a differential for motor vehicles and the like having differential gears and axles driven thereby; auxiliary differential gears carried by one of said axles and adapted to drive said first named gears, one of the spider gears of said auxiliary gears being of relatively smaller diameter than the other of said spider gears, manually operated means for controlling the movement of one of said spider gears for changing the speed ratio of said axles said means adapted to be actuated for locking said vehicle against reverse movement, and means for driving said auxiliary gears.

7. In a differential for motor vehicles and the like having differential gears and axles driven thereby; auxiliary differential gears carried by one of said axles and adapted to drive said first named gears, manually operated means for controlling the action of said auxiliary differential gears for changing the speed ratio of said axles, means cooperating with said auxiliary gears for locking said vehicle against reverse movement, and means for driving said auxiliary gears.

In testimony whereof, I set my hand, this 16th day of June 1932.

SAMUEL A. B. HAMILTON, Jr.